United States Patent
Lee et al.

(10) Patent No.: US 10,021,146 B2
(45) Date of Patent: Jul. 10, 2018

(54) ASYNCHRONOUS EVENT-DRIVEN MESSAGING FRAMEWORK FOR A REMOTE VIDEO ASSISTANCE SYSTEM

(71) Applicant: BANK OF AMERICA CORPORATION, Charlotte, NC (US)

(72) Inventors: Jisoo Lee, Chesterfield, NJ (US); Tal Shalom, Fair Lawn, NJ (US); Samuel Lubachevsky, Lawrenceville, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 392 days.

(21) Appl. No.: 14/804,143

(22) Filed: Jul. 20, 2015

(65) Prior Publication Data

US 2017/0026322 A1    Jan. 26, 2017

(51) Int. Cl.
  *H04L 12/58*    (2006.01)
  *H04L 29/06*    (2006.01)
(52) U.S. Cl.
  CPC ........ *H04L 65/1069* (2013.01); *H04L 65/104* (2013.01); *H04L 65/403* (2013.01); *H04L 65/605* (2013.01)
(58) Field of Classification Search
  CPC ...... H04L 51/10; H04L 51/046; H04L 65/104
  USPC ........................................................ 709/206
  See application file for complete search history.

(56) References Cited

U.S. PATENT DOCUMENTS

| 8,224,885 B1* | 7/2012 | Doucette | G06F 9/5044 |
| | | | 709/201 |
| 9,503,529 B2* | 11/2016 | Li | H04W 4/025 |
| 2013/0013704 A1* | 1/2013 | Pope | H04L 61/1541 |
| | | | 709/206 |
| 2013/0067109 A1* | 3/2013 | Dong | H04L 65/4069 |
| | | | 709/231 |
| 2014/0280980 A1* | 9/2014 | Schoenberg | H04L 65/1083 |
| | | | 709/227 |

* cited by examiner

*Primary Examiner* — Kevin Bates
*Assistant Examiner* — Nazia Naoreen
(74) *Attorney, Agent, or Firm* — Michael A. Springs; Moore & Van Allen PLLC; James C. Edwards

(57) ABSTRACT

The present invention provides an over-the-top intermediary application for delivering video assistance services. The invention brokers and coordinates all messaging between user and video assistant multimedia applications/platforms, as well as backend resource allocation infrastructure services. By encapsulating different protocol messages from disparate multimedia clients/vendors and backend infrastructure services into a common standard-based messaging protocol, the present invention is able to provide video assistance services regardless of which multimedia client is implemented by the user or video assistant and is able to readily implement new, emerging multimedia clients and backed infrastructure services in a plugin-like fashion. In addition, the video session broker of the present invention streamlines call workflow, maintains the presence of all user/video assistant endpoints, coordinates video session ignition requests and maintains messaging transport between users, video assistants and backend infrastructure resources.

17 Claims, 8 Drawing Sheets

ASYNCHRONOUS EVENT-DRIVEN MESSAGING FRAMEWORK FOR A REMOTE VIDEO ASSISTANCE SYSTEM

FIELD

In general, embodiments of the invention relate to remote video assistance and, more particularly, systems, method and computer program products for an over-the-top application that provides asynchronous event-driven messaging as a means for coordinating remote video assistance between a user (i.e., customer, client or the like) and a remote video assistant.

BACKGROUND

The use of remote video assistants is becoming prevalent in the financial institution/banking world, as well as other customer service environments, such as health care, retail, utilities, communications and the like. Remote video assistants are accessible through dedicated Automated Teller Assist (ATA) machines/devices, which may be located within a business, such as a financial institution/banking center or may be located at any other convenient location. Additionally, remote video assistants may be accessible via a user's device, such as a personal computer, laptop computer, touch pad device, mobile communication device, such as a smart phone, or the like.

In convention video assistance systems, multimedia services may be delivered by a single multimedia vendor/application that implements specific delivery protocols. Such use of specific multimedia vendors/application within the systems requires tight integration (i.e., software and protocol compatibility) between the multimedia vendor and the underlining resource allocation infrastructure (i.e., the infrastructure for assigning video assistants to users and managing the video assistant sessions).

Therefore, a need exists to develop systems, apparatus, computer program products, methods and the like that take a multimedia "vendor-agnostic" approach to the delivery of video assistance services. In this regard, an over-the-top application is desired that will allow for the delivery of video assistance regardless of which multimedia vendor/client is implemented by the user and/or the video assistants. As such, the desired system should be protocol and media client agnostic, meaning that video assistance services can be delivered regardless of which type of communication protocol is implemented by the specific media client/vendor that delivers the services. In addition the desired system should support any backend infrastructure service provided by or supported by the video assistance system regardless of communication protocol or the like. Moreover, the desired system should act as a video session broker to streamline call workflow and maintain the presence of all active user endpoints/computing platforms. Further, the desired systems should act as a coordinator for initiating video session requests and maintain messaging transport that seamlessly pass requisite parameters and action triggers to users and video assistants.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for an asynchronous event-driven messaging framework for a remote video assistance system. The intermediary platform of the present invention resides as an over-the-top application between the user/video assistant multimedia application/platform and the backend infrastructure support services. In addition, the present invention provides a video session brokerage framework that allows for multimedia client/vendor-agnostic and infrastructure support service-agnostic delivery of video assistance services; meaning that video assistance can be provided regardless of which multimedia client/vendor is used to conduct the video session and disparate backend infrastructure support services can be implemented in plugin fashion. In this regard, the messaging framework of the present invention provides for encapsulating different protocols (used by different multimedia clients/vendors and backend infrastructure services) within a common, standard-based messaging protocol, such as Extensible Messaging and Presence Protocol (XMPP) or the like that serves to streamline call workflow. As a result, the present invention is able to hide call setup and media exchange complexity from underlining backend resource allocation infrastructure Moreover, according to the present invention, the video session brokerage framework of the present invention, maintains the presence of all active client/video assistant endpoints through a persistent binding connection between session broker adaptors at the user/video assistant platforms and a connection manager at the intermediary video session broker platform. Additionally, the video session broker framework of the present invention serves to coordinate/broker all video session requests through a trigger-action mode, where the session initiation parameters hand-off occurs at the user platform. Additionally, the connection between the user and a video assistant is established by generating and communicating a common room key to the user platform and the video assistant platform, which is subsequently passed along by the user platforms and video assistant platforms to a designated media server, thus creating a virtual video room. Such a virtual video room obviates the need for the calling party application (i.e., user platform or video assistant platform) to directly call the hosting resource/party. Such issuance and presentation of a unique room key allows for multiple parties (i.e., more than two) to join the same virtual video room and, thus, participate in the video assistance.

Additionally, the video session broker framework of the present invention maintains all messaging transport between users and video assistants; passing and receiving all video session control parameters and action triggers to the user platforms and video assistant platforms.

A system for delivering a video assistance service defines first embodiments of the invention. The system includes a first computing platform (i.e., a user/customer/client platform) including a first memory and at least one first processor in communication with the first memory. The system additionally includes a remote video session module that is stored in the first memory and executable by the first processor. The remote video session module is configured to deliver the video assistance service to a user by implementing one of a plurality of different types of multimedia clients.

The system additionally includes a second computing platform (i.e., an intermediary over-the-top broker/coordination platform) including a second memory and at least one second processor in communication with second memory. In addition, the system includes a video session broker stored in the second memory, executable by the second processor, and configured to provide initiation and maintenance of the video assistance session between the user and one or more video assistants by implementing an asynchronous event-driven messaging framework that is configured to allow for video assistance sessions to be established via the remote video session module for each of the plurality of different types of multimedia clients.

In specific embodiments of the system, the video session broker is further configured to implement the asynchronous event-driven messaging framework to encapsulate different protocol messages from the different types of multimedia clients into a standard-based messaging protocol, such as Extensible Messaging and Presence Protocol (XMPP) or the like. In this regard, the present invention accommodates all of the various protocols implemented by the various different media clients/vendors, thereby, allowing the system to deliver remote video service to a user regardless of which media client/application that the user's device/platform has access to or otherwise executes.

In other specific embodiments the system includes a third computing platform (i.e., a video assistant platform including a third memory and at least one third processor in communication with the third memory. In such embodiments of the system, a remote video assistant module is stored in the third memory and executable by the third processor. The remote video assistant module is configured to connect the user to a video assistant by implementing one of the plurality of different types of multimedia clients.

In additional embodiments of the system, the video session broker is further configured to implement the asynchronous event-driven messaging framework to maintain an OTT messaging transport that provides for communicating video session parameters and action triggers to the remote video session module and the remote video assistant module. In related embodiments of the system, the video session broker is further configured to coordinate a request from the remote video session to establish a video assistance session between the user and the video assistance. In such embodiments of the system, the video session broker is further configured to establish the video assistance session by generating a room key for a virtual video room and communicating the room key, via an encapsulated message, to the remote video session module and the remote video assistant module. In response to receiving the room key, the remote video session module and the remote video assistant module present the room key to a designated media server to establish the remote video session (i.e., a virtual video room).

In further embodiments the system includes a fourth computing platform (back-end infrastructure resources/services) including a fourth memory and at least one fourth processor in communication with the fourth memory. In such embodiment the system includes a plurality of infrastructure services stored in the fourth memory and executable by the fourth processor. The infrastructure services are assigned to the video assistance session by the asynchronous event-driven messaging framework of the video session broker. In such embodiments of the system, the video session broker is further configured to encapsulate different protocol messages received from and communicated to the plurality of infrastructure services into a standard-based messaging protocol, such as XMPP or the like. Such infrastructure services may include, but are not limited to, authentication, signaling gateway (for translating telephony protocols), contact center (for managing session actions), monitoring actions (for taking actions based on session statistics), media client selection, video assistance hosting applications and the like.

Moreover, in further embodiments of the system the video session broker further comprises a connection manager that is configured to maintain a presence of active remote video session modules and remote video assistant modules through a persistent binding connection between the connection manager and a session broker adapter in an associated remote video session module or remote video assistant module.

In further embodiments of the system the video session broker is further configured to receive a request from the remote video session module to initiate the remote video session and, in response, broker the request in a trigger-action mode, wherein remote video session initiation parameters hand-off occurs at the remote video session module.

A method for delivering a video assistance service defines second embodiments of the invention. The method includes executing, by a computing device processor, a remote video session module within a video assistance user platform. The remote video session module is configured to deliver the video assistance service to a user by implementing any one of a plurality of different types of multimedia clients, The method further includes executing, by a computing device processor, an over-the-top video session broker that is configured to initiate and maintain a video assistance session between the user and a video assistant by implementing an asynchronous event-driven messaging framework that is configured to allow for video assistance sessions to be established via the remote video session module for each of the plurality of different types of multimedia clients.

A computer program product including a non-transitory computer-readable medium defines third embodiments of the invention. The Computer-readable medium includes a first set of codes for causing a computer to execute a remote video session module within a video assistance user platform. The remote video session module is configured to deliver the video assistance service to a user by implementing any one of a plurality of different types of multimedia clients, The computer-readable medium additionally includes a second set of codes for causing a computer to execute an over-the-top video session broker that is configured to initiate and maintain a video assistance session between the user and a video assistant by implementing an asynchronous event-driven messaging framework that is configured to allow for video assistance sessions to be established via the remote video session module for each of the plurality of different types of multimedia clients.

Thus, systems, apparatus, methods, and computer program products herein described in detail below provide for an over-the-top intermediary application for delivering video assistance services. The systems and the like described herein broker and coordinate all messaging between user and video assistant multimedia applications/platforms, as well as backend resource allocation infrastructure services. By encapsulating different protocol messages from disparate multimedia clients/vendors and backend infrastructure services into a common standard-based messaging protocol, the present invention is able to provide video assistance services regardless of which multimedia client is implemented by the user or video assistant and is able to readily implement new, emerging multimedia clients and backed infrastructure services in a plugin-like fashion. In addition, the video session broker of the present invention streamlines call workflow, maintains the presence of all user/video assistant endpoints, coordinates video session ignition requests and maintains messaging transport between users, video assistants and backend infrastructure resources.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
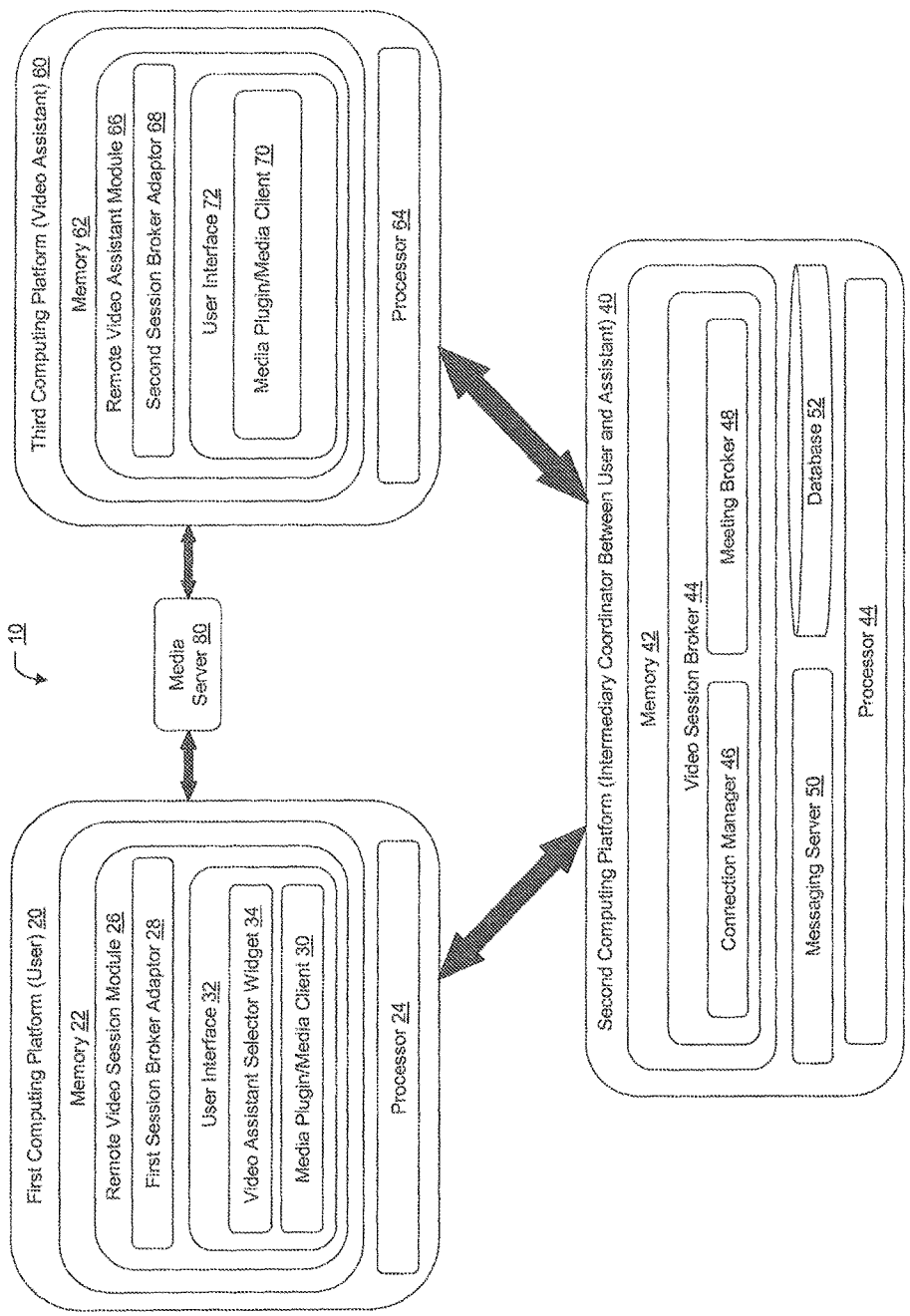
Figure 2:
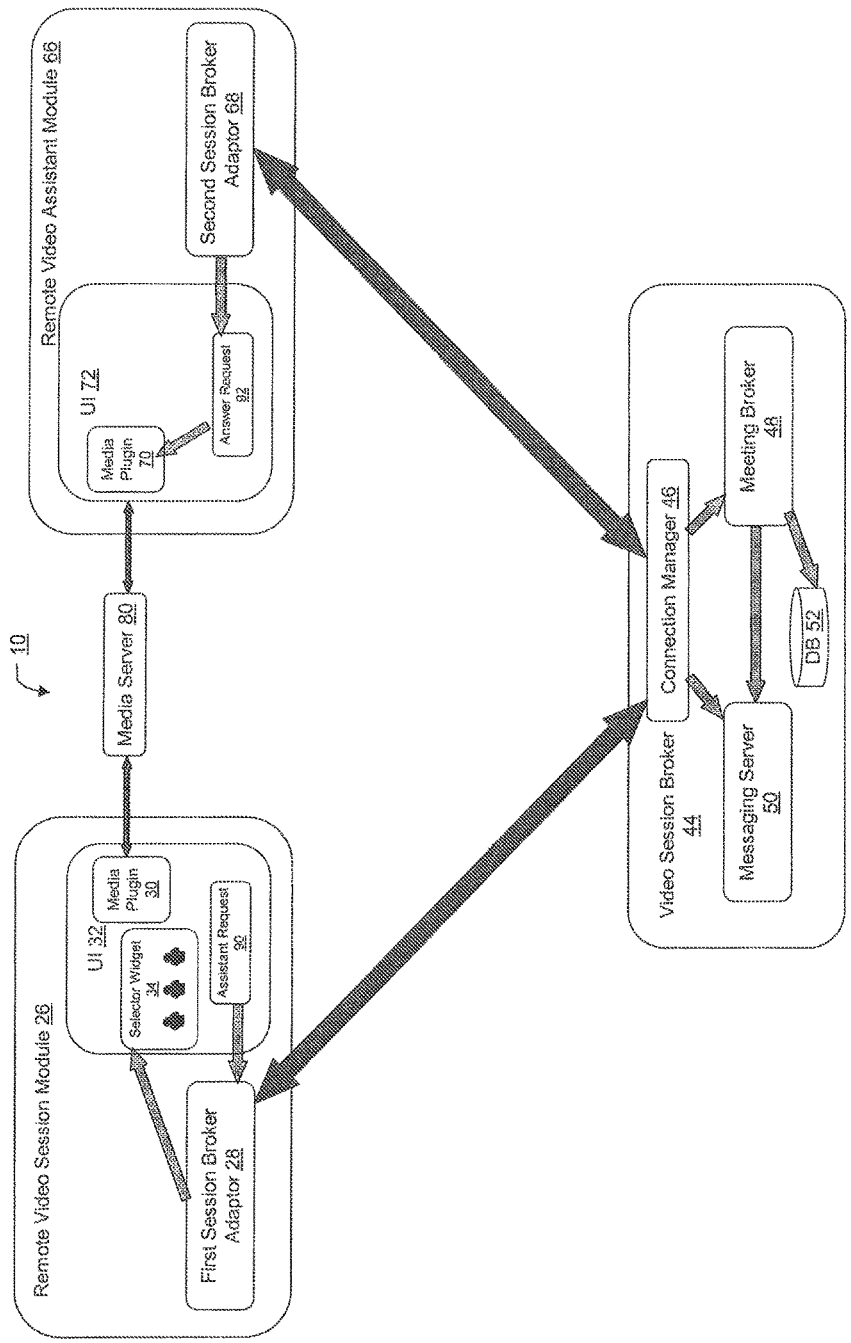
Figure 3:
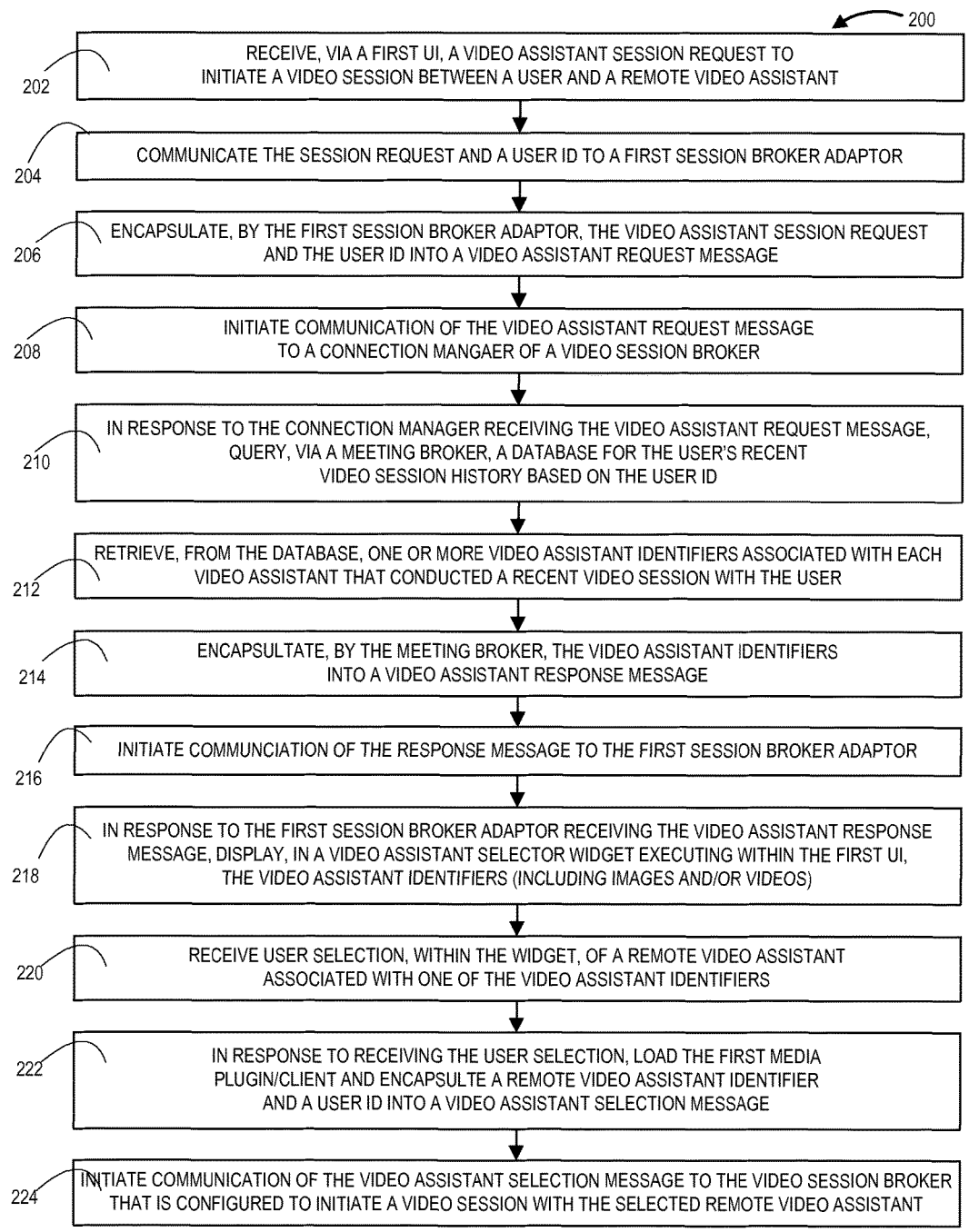
Figure 4:
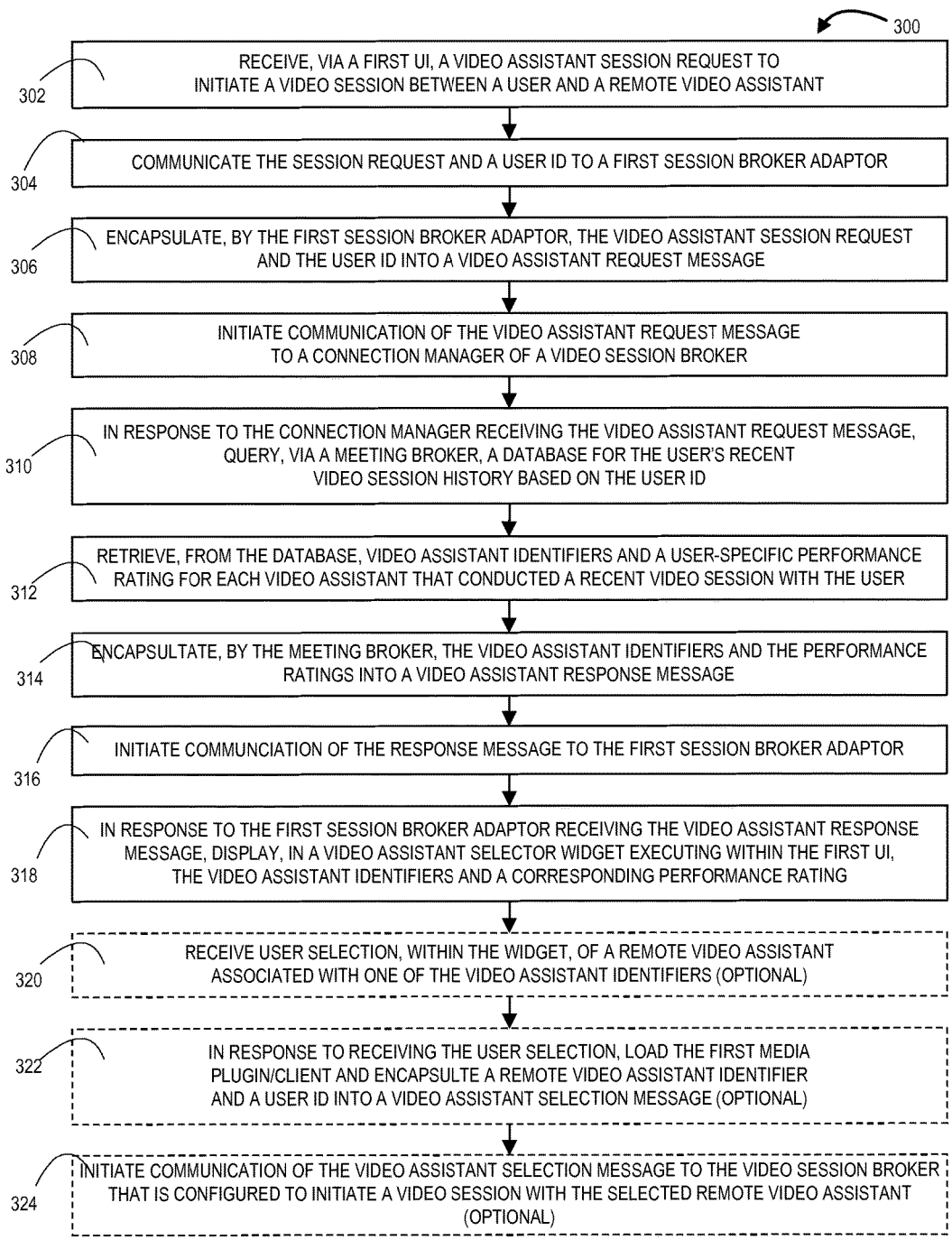
Figure 5:
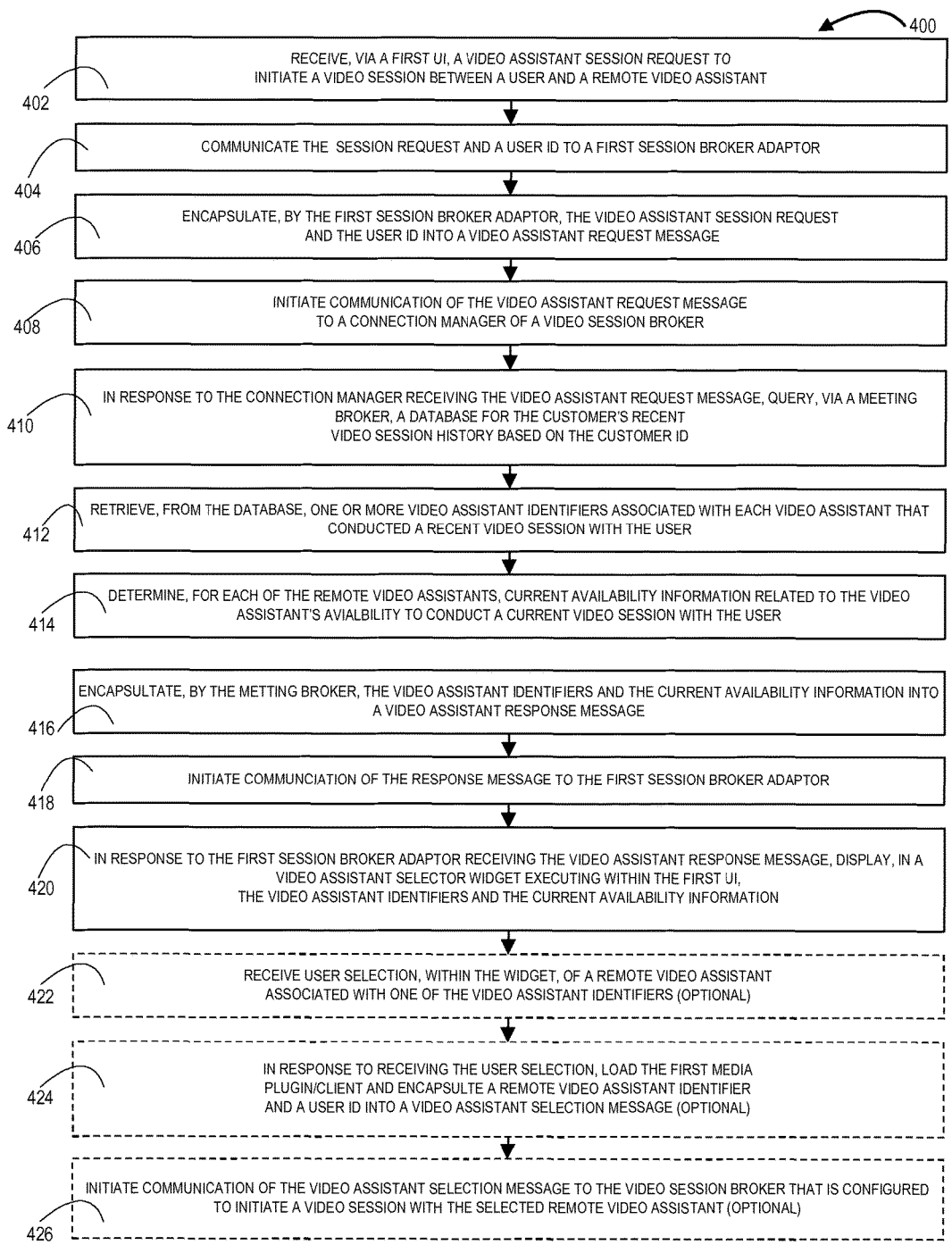
Figure 6:
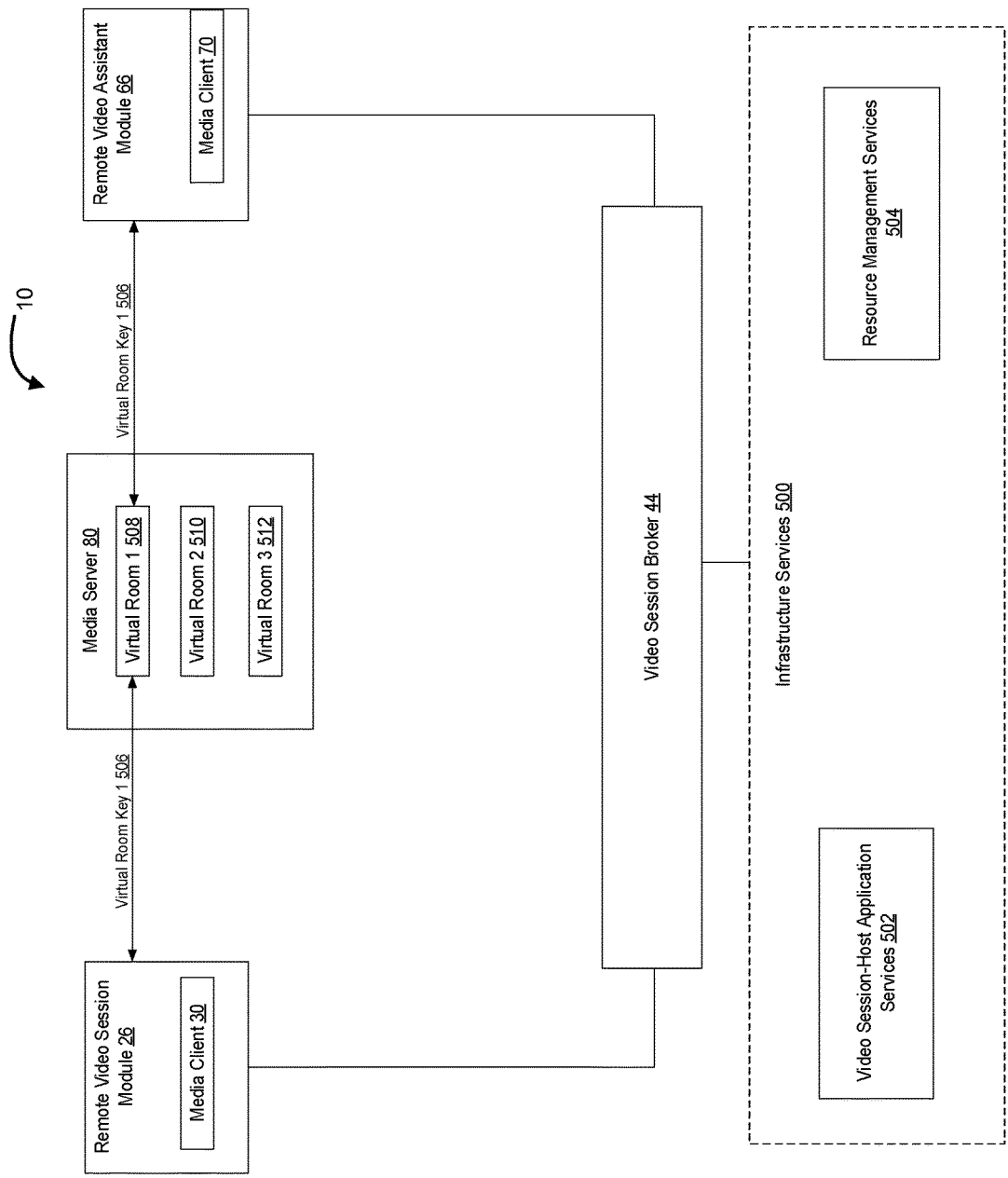
Figure 7:
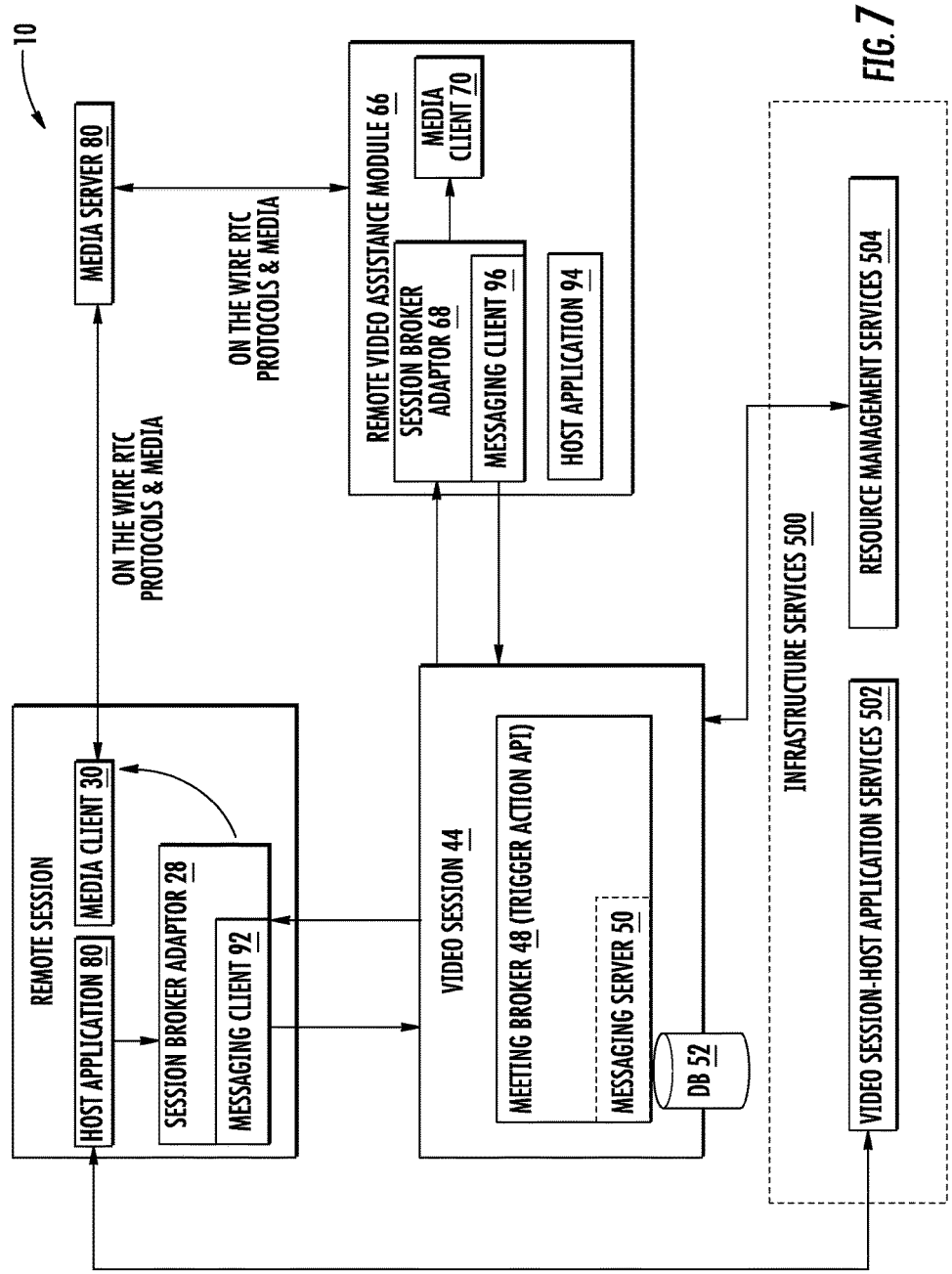
Figure 8:
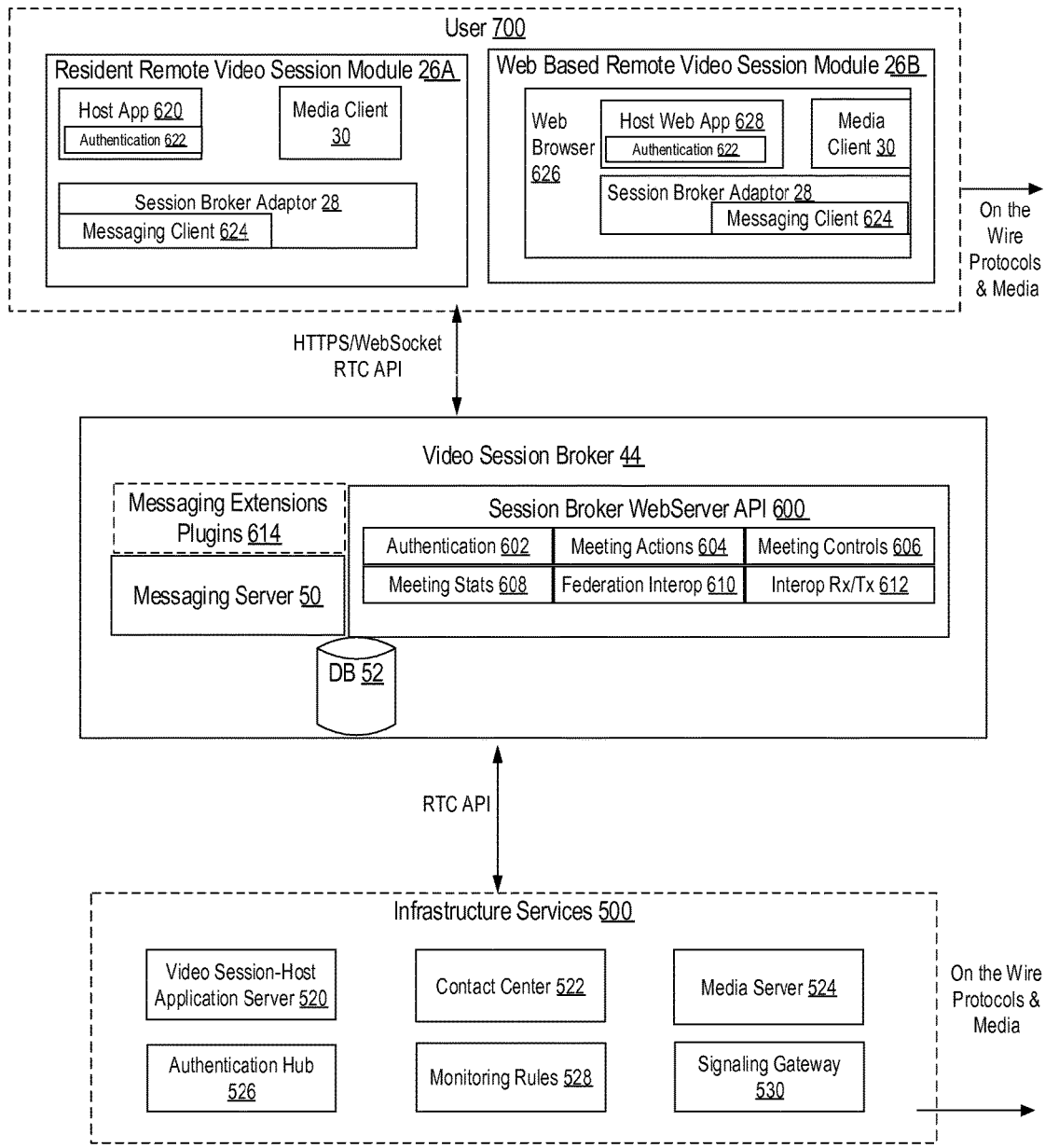

Having thus described embodiments of the invention in general terms, reference will now be made to the accompanying drawings, which are not necessarily drawn to scale, and wherein:

FIG. 1 provides a schematic diagram of a system for providing video assistance including personalized remote video assistant selection, in accordance with embodiments of the present invention;

FIG. 2 provides a block diagram of a system for providing video assistance highlighting messaging for personalized remote video assistant selection, in accordance with embodiments of the present invention;

FIG. 3 provides a flow diagram of a method for personalized remote video assistant selection within a video assistance system;

FIG. 4 provides a flow diagram of a method for providing personalized performance ratings for video assistant that a user has previously contacted within a video assistance system, in accordance with embodiments of the present invention;

FIG. 5 provides a flow diagram of a method for providing video assistant-specific availability information for previously contacted video assistants within a video assistance system, in accordance with embodiments of the present invention;

FIG. 6 provides a schematic diagram of a high-level video session broker framework architecture, in accordance with embodiments of the present invention;

FIG. 7 provides a schematic diagram of a video session framework architecture highlighting call flow for initiating a video session, in accordance with embodiments of the present invention; and FIG. 8 provides a schematic diagram of a high-level video session broker framework architecture highlighting session broker interaction with infrastructure services, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for an asynchronous event-driven messaging framework for a remote video assistance system. The intermediary platform of the present invention resides as an over-the-top application between the user/video assistant multimedia application/platform and the backend infrastructure support services. In addition, the present invention provides a video session brokerage framework that allows for multimedia client/vendor-agnostic and infrastructure support service-agnostic delivery of video assistance services; meaning that video assistance can be provided regardless of which multimedia client/vendor is used to conduct the video session and disparate backend infrastructure support services can be implemented in plugin fashion. In this regard, the messaging framework of the present invention provides for encapsulating different protocols (used by different multimedia clients/vendors and backend infrastructure services) within a common, standard-based messaging protocol, such as Extensible Messaging and Presence Protocol (XMPP) or the like. As a result, the present invention is able to hide call setup and media exchange complexity from underlining backend resource allocation infrastructure Moreover, according to the present invention, the video session brokerage framework of the present invention, maintains the presence of all active client/video assistant endpoints through a persistent binding connection between session broker adaptors at the user/video assistant platforms and a connection manager at the intermediary video session broker platform. Additionally, the video session broker framework of the present invention serves to coordinate/broker all video session requests through a trigger-action mode, where the session initiation parameters hand-off occurs at the user platform.

Additionally, the connection between the user and a video assistant is established by generating and communicating a common room key to the user platform and the video assistant platform, which is subsequently passed along by the user platforms and video assistant platforms to a designated media server, thus creating a virtual video room. Such a virtual video room obviates the need for the calling party application (i.e., user platform or video assistant platform) to directly call the hosting resource/party. Such issuance and presentation of a unique room key allows for multiple parties (i.e., more than two) to join the same virtual video room and, thus, participate in the video assistance.

Additionally, the video session broker framework of the present invention maintains all messaging transport between users and video assistants; passing and receiving all video session control parameters and action triggers to the user platforms and video assistant platforms.

Referring to FIG. 1, a schematic diagram is provided of a system 10 for providing remote video assistance, in accordance with embodiments of the present invention. Remote video assistance allows a user to contact a video assistant for the purpose of obtaining assistance for a desired need. Through video display the user is able to not only talk with the video assistance but also see the video assistant that they are interacting/transacting with in real-time. In this regard, an interaction with a video assistant replicates a live face-to-face interaction. Use of video assistance is currently prevalent in the financial institution/banking environment, in which dedicated Automated Teller Assist (ATA) machines have been employed, as well as providing for video assistance through customer platforms, such as personal computers, mobile/laptop computers, mobile devices, such as smart telephones and the like. Other instances in which video assistance is gaining acceptance include other customer service/support environments in which a user/customer requires assistance by a remote associate/assistant. For example, remote video assistants have been used in the health field (i.e., users connect to a remote health care assistant via Web application or the like), in the retail business environment (i.e., customers connect to a video associate to purchase an item or asks questions about items), in the utilities/services field (i.e., customers connect with a video representative to make a payment, changes services or the like).

The system of the present invention implements a first computing platform 20 (i.e., a user's platform), a second computing platform 40 (i.e., an intermediary or middleware framework that serves to coordinate/relay user application requests to back-end resource platforms for the purpose of making a connection between a user and a video assistance) and a third computing platform (i.e., a video assistant platform/workstation). It should be noted that while the illustrated embodiments shows only one first, second and third computing platform it will be appreciated that working system will include multiple, first, second and/or third computing platforms.

The first computing platform 20 includes a memory 22 and at least one processor 24 in communication with the memory. As previously noted the first computing platform 20 may be a dedicated ATA machine/device or any other computing device having a display that is suitable for conducting a video assistance session. Computing platform 20 can receive and execute algorithms, such as modules, routines, and applications. Memory 22 may comprise volatile and non-volatile memory, such as read-only and/or random-access memory (RAM and ROM), EPROM, EEPROM, flash cards, or any memory common to computer platforms. Further, memory 22 may include one or more flash memory cells, or may be any secondary or tertiary storage device, such as magnetic media, optical media, tape, or soft or hard disk. Moreover, memory 22 may comprise cloud storage, such as provided by a cloud storage service and/or a cloud connection service.

Further, processor 24 may be an application-specific integrated circuit ("ASIC"), or other chipset, processor, logic circuit, or other data processing device. Processor 24 or other processor such as ASIC may execute an application programming interface ("API") (not shown in FIG. 1) that interfaces with any resident programs, such as remote video session module 26 and routines, sub-modules associated therewith or the like stored in the memory 22 of computing platform 20.

Processor 24 includes various processing subsystems (not shown in FIG. 1) embodied in hardware, firmware, software, and combinations thereof, that enable the functionality of system 10 and the operability of the system on a network. For example, processing subsystems allow for initiating and maintaining communications and exchanging data with other networked computing platforms, such as second computing platform 40, third computing platform 60 and media server 80. For the disclosed aspects, processing subsystems of processor 24 may include any subsystem used in conjunction with remote video session module 26 and related algorithms, sub-algorithms, modules, sub-modules thereof.

Computer platform 20 may additionally include a communications module (not shown in FIG. 1) embodied in hardware, firmware, software, and combinations thereof, that enables communications among the various components of the computing platform 20, as well as between the other networked devices. Thus, communication module may include the requisite hardware, firmware, software and/or combinations thereof for establishing and maintaining a network communication connection.

Memory 22 of computing platform 20 stores remote video session module 26 that is executable by processor 24 and configured to establish and maintain a video session with a remote video assistant. Remote video session module 26 includes first session broker adaptor 28 that is configured to generate and initiate communication of messages to the second computing platform (i.e., the over-the-top middleware component), as well as receive messages from the second computing platform. In this regard, first session broker adaptor 28 is configured to encapsulate data according to a predetermined industry standard protocol to generate messages. In specific embodiments the protocol may include, but is not limited to, HyperText Transfer Protocol (HTTP), HyperText Transfer Protocol Secure (HTTPS), Extensible Messaging and Presence Protocol (XMPP), JavaScript Object Notation (JSON) or the like. In a preferred embodiment, XMPP messaging is utilized. The messages may be communicated as chat messages, publish subscribe (PubSub) or the like.

The remote video session module 26 additionally includes instructions for generating and displaying User Interface (UI) 32 that is configured to present a video assistant selector widget 34 that allows the user to select a video assistant for a current video assistance session based on previously contacted video assistants. In specific embodiment of the system, the video assistant selector widget 34 is configured to present video assistant identifiers. The video assistant identifiers may include, but are not limited to, images/photos of the video assistants, videos of the video assistant (e.g., a video greeting or a snippet of a portion of previous video assistance session held with the video assistant).

In additional embodiments of the system, the video assistant selector widget 34 is additionally configured to present a performance rating for each of the video assistants that are displayed in the widget. The performance rating is specific to the user and reflects one or more of the performance rating given by the user for the last-in-time session with a video assistant and/or the average performance rating given by the user for all the interactions between the user and the specific video assistant.

In further embodiments of the system, the video assistant selector widget 34 is additionally configured to present availability information for each of the video assistants that are displayed in the widget. The availability information may include an approximate wait time, such as a dynamic clock that approximates how long the user will have to wait if they select that particular video assistant.

Additionally, the user interface has access to a media plugin 30 that is configured to execute a media client (i.e., video conferencing platform) within the user interface 32 to allow for the video session to appear on the display of the user's device. Specific to the present invention, the implementation of the intermediary middleware framework allows for the media client application executing on the first computing platform 20 to be disparate from the media client application executing on the third computing platform 60. Such use of different media clients on the user platform and the video assistant platform is made possible by the second computing platform creating a virtual conference room, in which the second computing platform 40 (i.e., the middleware framework) generates and distributes the same Room Key to both the first/use computing platform 20 and the third/video assistant computing platform 60.

The second computing platform 40 (i.e., the middleware framework that coordinates/relays remote video session module 26 requests to back-end resources) includes a memory 42 and at least one processor 44. The second computing platform is configured as a middleware framework that coordinates/relays remote video session module 26 requests to back-end resources. Computing platform 40 can receive and execute algorithms, such as modules, routines, and applications. Memory 42 may comprise volatile and non-volatile memory, such as read-only and/or random-access memory (RAM and ROM), EPROM, EEPROM, or any memory common to middleware framework computer platforms. Further, processor 44 may be an application-specific integrated circuit ("ASIC"), or other chipset, processor, logic circuit, or other data processing device. Processor 44 or other processor such as ASIC may execute an application programming interface ("API") (not shown in FIG. 1) that interfaces with any resident programs, such as video session broker 44 and routines, sub-modules associated therewith or the like stored in the memory 42 of computing platform 40. Processor 24 includes various processing subsystems (not shown in FIG. 1) embodied in hardware, firmware, software, and combinations thereof, that enable the functionality of computing platform 40 and the operability of the platform 40 on a network. For example, processing subsystems allow for initiating and maintaining communications and exchanging data with other networked computing platforms, such as second computing platform 40, third computing platform 60 and the like. For the disclosed aspects, processing subsystems of processor 44 may include any subsystem used in conjunction with video session broker 44 and related algorithms, sub-algorithms, modules, sub-modules thereof.

Computer platform 40 may additionally include a communications module (not shown in FIG. 1) embodied in hardware, firmware, software, and combinations thereof, that enables communications among the various components of the computing platform 40, as well as between the other networked devices. Thus, communication module may include the requisite hardware, firmware, software and/or combinations thereof for establishing and maintaining a network communication connection.

Memory 42 of computing platform 40 includes messaging server 50, which may comprise an XMPP server or the like, which hosts all messages communicated from the remote video session module and/or remote video assistant module 66.

Additionally memory 42 stores video session broker 44 that is configured to coordinate and relay requests from the remote video session module 26 to back-end resources and broker the connection between the user and video assistant.

The video session broker 44 includes connection manager 46 that is configured to have a persistent binding connection with first session broker adaptor 28 and second session broker adaptor 68. Additionally, Video session broker includes meeting broker 48 that is configured to receive meeting requests from the remote video session module and, in response query database 52 to determine the recent video session history (i.e., recent video calls) associated with the user/requester. The recent video session history is used to identify video assistants that the user previously interacted/ transacted with, along with, in some embodiments of the invention, performance ratings given by the user to the identified previously contacted video assistants and/or availability information for the previously contacted video assistants.

In additional embodiments of the invention, the database is queried to determine user-specific performance ratings of the video assistants that the user previously interacted/ transacted with. The performance rating may be performance rating related to the last-in-time video teller interaction that the user conducted with the video assistant or the performance rating may be an average of a plurality of interactions that the user conducted with the video assistant.

Moreover, the database along with availability logic may be queried to determine the availability of the video assistants that the user previously interacted/transacted with. Determining availability may include determine if a video assistant is currently available for video assistance (i.e., whether a video assistant is currently working) and/or determining the wait time for an available assistant. The wait time may be based on the video assistance average call/session time (as identified in the database), the length of the video assistant's current call/session and the quantity of calls/ sessions that the video assistant currently has in their call queue (i.e., how many other users are waiting to interact with that particular video assistant).

The third computing platform 60 (i.e., the video assistant computing platform) includes a memory 62 and at least one processor 64. Similar to first and second computing platforms 20 and 40, third computing platform 60 can receive and execute algorithms, such as modules, routines, and applications. Memory 62 may comprise volatile and nonvolatile memory, such as read-only and/or random-access memory (RAM and ROM), EPROM, EEPROM, flash cards, or any memory common to computer platforms. Further, memory 62 may include one or more flash memory cells, or may be any secondary or tertiary storage device, such as magnetic media, optical media, tape, or soft or hard disk. Moreover, memory 62 may comprise cloud storage, such as provided by a cloud storage service and/or a cloud connection service. Processor 64 may be an application-specific integrated circuit ("ASIC"), or other chipset, processor, logic circuit, or other data processing device. Processor 64 or other processor such as ASIC may execute an application programming interface ("API") (not shown in FIG. 1) that interfaces with any resident programs, such as remote video assistant module 66 and routines, sub-modules associated therewith or the like stored in the memory 62 of computing platform 60. Additionally, processor 64 includes various processing subsystems (not shown in FIG. 1) embodied in hardware, firmware, software, and combinations thereof, that enable the functionality of computing platform 60 and the operability of the platform 60 on a network. For example, processing subsystems allow for initiating and maintaining communications and exchanging data with other networked computing platforms, such as third computing platform 60, media server 80 and the like. For the disclosed aspects, processing subsystems of processor 64 may include any subsystem used in conjunction with remote video assistant module 66 and related algorithms, sub-algorithms, modules, sub-modules thereof.

As previously noted, memory 62 of computing platform 60 stores remote video assistant module 66 that is executable by processor 64 and configured to establish and maintain a video session with a user. Similar to remote video session module 26 of the first computing platform 20, the remote video assistant module 66 includes a session adapter, second session broker adaptor 68 that is configured to generate and initiate communication of messages to the second computing platform 40 (i.e., the over-the-top middleware component), as well as receive messages from the second computing platform 40. In this regard, second session broker adaptor 68 is configured to encapsulate data according to a predetermined industry standard protocol (e.g., XMPP, HTTP, HTTPS, JSON or the like) to generate messages. The messages may be communicated as chat messages, Publish Subscribe (PubSub) or the like.

The remote video assistant module 66 additionally includes instructions for generating and displaying User Interface (UI) 72 that access to a media plugin 70 that is configured to execute a media client (i.e., video conferencing platform) within the user interface 72 to allow for the video session to appear on the display of the video assistant's device. As previously discussed, specific to the present invention, the implementation of the intermediary middleware framework allows for the media client application executing on the third computing platform 60 to be disparate from the media client application executing on the first computing platform 20. Such use of different media clients on the user platform and the video assistant platform is made possible by the second computing platform 40 creating a virtual conference room, in which the second computing platform 40 (i.e., the middleware framework) generates and distributes the same Room Key to both the first/user computing platform 20 and the third/video assistant computing platform 60. Thus the media plugin 30 associated with the first computing platform 20 and the media plugin 70 associated with the third computing platform 60 will present/ communicate the a virtual room ID (i.e., room key) to the media server 80 to initiate the video session between the user and selected video assistant.

Referring to FIG. 2, a block diagram is presented of a system 10 highlighting a methodology for selecting a video assistance which a user has previously interacted with, along with optional presentation of performance rating and availability information, in accordance with embodiments of the present invention. The methodology begins by user selecting (e.g., clicking on or the like) a designated icon or another indicator for video assistance displayed within the User Interface (UI) of the remote video session module 32. The remote video session module 32 may be executed on a dedicated device, such as an Automated Teller Assist (ATA) device, or a user-possessed device, such as PC, laptop computer, mobile device, including a smart phone or the like. Prior to the user selecting the video assistance option or after the user has selected the video assistance option, the user is required to enter/log-in requisite credentials (e.g., username and/or password) to identify the user and, in some embodiments, identify the user as an authorized/registered video assistance user. Once the user has requested video assistance, the User Interface (UI) 32 of the remote video module 32 sends assistant request 90, along with a user identifier (as determined from the log-in procedure), to the first session broker adaptor 28. In turn the first session broker adaptor 28 encapsulates the assistance request 90 into a session request message using a predetermined industry standard protocol, such as XMPP, HTTP, HTTPS, JSON or the like.

The session request message is subsequently communicated, via a communications network, to the meeting broker 48 of the video session broker 44. As previously noted, the first session broker adapter 28 has a persistent bind connection with the connection manager 46 of the video session broker 44. All messages received from the remote video session module 26, and the remote video assistant module 66 are hosted on a messaging server, such as an XMPP server or the like. Upon receipt of the session request message, the meeting broker 48 queries the database 52, based on the user identifier, for the customer's recent video session history. The database stores user's recent video session history including a video assistant identifier. The video assistant identifier may be the name of the video assistant or the identifier may include an image/photo of the video assistant. Additionally, the video assistant identifier may include a video clip of the video assistant, such as a pre-recorded video greeting or a snippet of the last video session between the user and the video assistant. Upon querying the database, the meeting broker 48 retrieves the video assistant identifier(s) associated with the recent video sessions.

In specific embodiments of the invention, the database also includes at least one user-specific performance rating associated with one or more of the video assistants that the user has recently conducted a video session with. As previously noted the performance rating may be a session-specific performance rating, which was provided by the user at or near the conclusion of the recent video session and/or the performance rating may be an average of a plurality of, such as all, the video sessions conducted between the user and that particular video assistant. In such embodiments of the invention, the meeting broker may retrieve both the video assistant identifiers and the performance ratings associated with the video assistants.

In other specific embodiments of the invention, the meeting broker 48 in conjunction with the messaging server 50 will determine availability information for the video assistants that the user previously conducted video interactions with. The messaging server 50 may track video assistant availability based on video assistant identifier and record, in the database 52 or the like, the average length of a call/session for a video assistant. The meeting broker 48 may also determine a current wait for a video assistant based on average length of a call for the video assistant, the length of the video assistant's current call and the quantity of assistant requests currently queued for that particular video assistant.

Once the meeting broker 48 has retrieved the applicable video assistant data from database 52, the meeting broker 48 encapsulates the data (e.g., video assistant identifiers, including images, videos and the like; performance ratings; and availability information) into a video assistant response message using the predetermined chosen protocol, e.g., XMPP or the like and communicates the message, via the connection manager 46, to the first session broker adapter 28 of the remote video session module 26.

In response to the first session broker adapter 28 receiving the response message, a video assistant selector widget 34 is launched within the UI 32 and the video assistant identifiers are displayed within the widget 34. In specific embodiments of the invention, such display of the video assistant identifiers will include display of the image of the video assistant and/or access to or execution of the video clip associated with the video assistant. In other embodiments of the invention, the video assistant identifiers, such as images and/or video clips may be displayed in conjunction with the user-specific performance ratings or the video assistant-specific availability information. For example, an image of a video assistant may be displayed and the associated user-specific performance rating and/or the availability information (e.g., currently unavailable, currently available, currently available with a specified wait time). In those embodiments in which a wait time is time is displayed, the wait time may be dynamically displayed in the form of a running clock that counts down the approximate wait time for video assistant based on the average length of calls for the video assistant, the current length of the call that the video assistant is currently conducting and the quantity of calls/session that the video assistant currently has in their queue.

Once the video assistant identifiers and other information has been displayed the user may select a video assistant from the displayed previously used video assistant or the user may select to conduct the session with a new video assistant (i.e. a random video assistant that the user has not interacted with in the recent past). It should also be noticed that once the video assistant identifiers are displayed in the widget 34, a user may provide filters to the video assistants (e.g., based on call/session type or the like) to insure that the video assistant selected meets the needs of the currently requested call session. In other embodiments of the invention the filets may be applied by the user at the time of the request, such that the video session broker only returns video assistants that the user previously interacted with and that meet the filter criteria imposed by the user.

Once a video assistant has been selected, the media plugin/client 30 is loaded within the UI 32 and the first session broker adapter 28 receives the video assistant selection and encapsulates a video assistant identifier and a user identifier into a video assistant selection message, which is subsequently communicated to the video session broker 44. In turn, the meeting broker 48 of the video session broker 44, generated a room key which is encapsulated and communicated to the remote video session module and the remote video assistant module 66 of the selected video assistant. Based on the remote video session module 26 providing the room key to the media plugin/client 30, the media client 30 will call the media server 80 and present the room key. In turn the media server 80, will call the remote video assistant module to notify the video assistant of the pending video session. Once the remote video assistant module 66 is in receipt of the message containing the room key, the remote video assistant module 66 loads the media plugin/client 70 and communicates the room key to the media server 80 to connect the user to the video assistant via a live video/audio session.

Referring to FIG. 3 a flow diagram is presented of a method 200 for providing personalized user selection of remote video assistants based on the user's video call history, in accordance with embodiments of the present invention. At Event 202, a video assistant session request is received from a user as a means of initiating a video session between the user the video assistant. The video assistant request is received within a UI executing on a user device/platform. As previously noted the user device/platform may be a dedicated device configured for conducting video sessions, such as an Automated Teller Assist (ATA) device deployed by financial institutions or the like, or the device may be a user-possessed device, such as a PC, laptop, mobile computing device, such as a table, smart phone or the like. Prior to receiving the video assistant request or in response to receiving the video assistant request, the user's credentials (i.e., username and/or password) may be received as a means of identifying the user and/or verifying that the user is authorized/registered to use the video assistance system.

At Event 204, the UI communicates the video session request to a first video session broker adaptor that, at Event 206, encapsulates the request, along with a user identifier, into a video assistant request message using a predetermined industry standard protocol, such as XMPP, HTTP, HTTPS, JSON or the like. Subsequently, at Event 208, the message is communicated, as a chat message, a Publish Subscribe message or the like, to a connection manage of a video session broker that has a persistent binding connection with the first session broker adaptor.

At Event 210, in response to the meeting broker receiving the video assistant request message, a database is queried, based on the user identifier, for the user's recent video session history. The recent history may be preconfigured as a prescribed number of previous video session or the video sessions conducted over a predetermined prior time period. At Event 212, one or more video assistant identifiers associated with each video assistant that conducted a previous video session with the user is retrieved from the database. The video assistant identifiers may include the name of the video assistant and any other relevant profile data (e.g., specific areas of expertise or the like). In specific embodiments the video assistant identifiers may include an image of the video assistant and/or a video clip of the video assistant. The video clip may be a prerecorded greeting by the video assistant or a snippet of a previous video session conducted between the user and the video assistant. When presented on the UI of the user's device, the image or video clip serves to provide the user with recognition of the previously contacted video assistant.

At Event 214, the meeting broker encapsulates the video assistant identifier(s) into a video assistant response message using the predetermined protocol of choice, e.g., XMPP, HTPP, HTPPS, JSON or the like and, at Event 216, the response message is communicated back to the first session broker adaptor of the remote video session module executing on the user device. In response to the first session broker adaptor receiving the response message, at Event 218, a video assistant selector widget is launched within the UI of the user's device and the widget displays the video assistant identifiers. In specific embodiments of the invention, such display includes display of the image(s) and/or videos associated with the video assistants.

At Event 220, a user selection of a video assistant is received within the video assistant selection widget and, at Event 222, in response to receiving the user selection of the video assistant, a media plugin/client is loaded on the user device that is configured to provide a video session between the user and the selected video assistant. Additionally, a video assistant identifier associated with the selected video assistant and the user identifier are encapsulated into a video assistant selection message using the predetermined protocol. At Event 224, the video assistant selection message is communicated to video session broker, which, in turn, is configured to initiate a video session with the selected remote video assistant by generating and communicating a common room key to the user' device/platform and the video assistant's device/platform. The common room key is presented by corresponding media clients to a designated media server to initiate the video/audio connection between the user's device/platform and the video assistant' device/platform.

Referring to FIG. 4 a flow diagram is presented of a method 300 for providing personalized user selection of remote video assistants based on the user's video call history including user-specific performance ratings of the previously used video assistants, in accordance with embodiments of the present invention. At Event 302, a video assistant session request is received from a user as a means of initiating a video session between the user the video assistant. The video assistant request is received within a UI executing on a user device/platform. As previously noted the user device/platform may be a dedicated device configured for conducting video sessions, such as an Automated Teller Assist (ATA) device deployed by financial institutions or the like, or the device may be a user-possessed device, such as a PC, laptop, mobile computing device, such as a table, smart phone or the like. Prior to receiving the video assistant request or in response to receiving the video assistant request, the user's credentials (i.e., username and/or password) may be received as a means of identifying the user and/or verifying that the user is authorized/registered to use the video assistance system.

At Event 304, the UI communicates the video session request to a first video session broker adaptor that, at Event 306, encapsulates the request, along with a user identifier, into a video assistant request message using a predetermined industry standard protocol, such as XMPP, HTTP, HTTPS, JSON or the like. Subsequently, at Event 308, the message is communicated, as a chat message, a Publish Subscribe (PubSub) message or the like, to a connection manage of a video session broker that has a persistent binding connection with the first session broker adaptor.

At Event 310, in response to the meeting broker receiving the video assistant request message, a database is queried, based on the user identifier, for the user's recent video session history. The recent history may be preconfigured as a prescribed number of previous video session or the video sessions conducted over a predetermined prior time period. At Event 312, one or more video assistant identifiers associated with each video assistant that conducted a previous video session with the user and one or more associated user-specific performance ratings are retrieved from the database.

As previously discussed in relation to FIG. 3, the video assistant identifiers may include the name of the video assistant and any other relevant profile data (e.g., specific areas of expertise or the like). In specific embodiments the video assistant identifiers may include an image of the video assistant and/or a video clip of the video assistant. The video clip may be a prerecorded greeting by the video assistant or a snippet of a previous video session conducted between the user and the video assistant.

The user-specific performance rating may include a specific performance rating given by the user at or near the completing of the last-in-time video session conducted between the video assistant and user and/or the average of a plurality, in some instances all, of the previous video sessions between the user and the video assistant. In addition, the meeting broker may retrieve the video assistant's overall/composite performance rating based on performance ratings provided by all system users.

In this regard, the video assistance system of the present invention is able to provide the user, within a performance rating widget or the like, with a video assistant performance rating query that is displayed to the user at or near the conclusion of the session with the video assistant. It should be noted that in certain instances a user's single video interaction may include multiple different sessions with different video assistants (i.e., each different video assistant having different fields of expertise or the like). As such, the system is configured to provide the performance query at or near the end of each video session, such that one single composite video interaction may result in more than one performance rating, each rating being associated with a different video assistant that the user interacted with.

At Event 314, the meeting broker encapsulates the video assistant identifier(s) and the performance ratings into a video assistant response message using the predetermined protocol of choice, e.g., XMPP, HTPP, HTPPS, JSON or the like and, at Event 316, the response message is communicated back to the first session broker adaptor of the remote video session module executing on the user device. In response to the first session broker adaptor receiving the response message, at Event 318, a video assistant selector widget is launched within the UI of the user's device and the widget displays the video assistant identifiers and, where applicable, the corresponding performance rating(s). In specific embodiments of the invention, such display includes display of the image(s) and/or videos associated with the video assistants. In addition to displaying the user-specific performance rating(s), the widget may also display the overall/composite performance rating of the video assistant, so that the user may compare their performance ratings to the video assistants overall system-wide performance ratings.

At Optional Event 320, a user selection of a video assistant is received within the video assistant selection widget and, at Optional Event 322, in response to receiving the user selection of the video assistant, a media plugin/client is loaded on the user device that is configured to provide a video session between the user and the selected video assistant. Additionally, a video assistant identifier associated with the selected video assistant and the user identifier are encapsulated into a video assistant selection message using the predetermined protocol. At Optional Event 324, the video assistant selection message is communicated to video session broker, which, in turn, is configured to initiate a video session with the selected remote video assistant by generating and communicating a common room key to the user' device/platform and the video assistant's device/platform.

Referring to FIG. 5 a flow diagram is presented of a method 400 for providing personalized user selection of remote video assistants based on the user's video call history, including dynamic video assistant availability information, in accordance with embodiments of the present invention. At Event 402, a video assistant session request is received from a user as a means of initiating a video session between the user the video assistant. The video assistant request is received within a UI executing on a user device/platform. As previously noted the user device/platform may be a dedicated device configured for conducting video sessions, such as an Automated Teller Assist (ATA) device deployed by financial institutions or the like, or the device may be a user-possessed device, such as a PC, laptop, mobile computing device, such as a table, smart phone or the like. Prior to receiving the video assistant request or in response to receiving the video assistant request, the user's credentials (i.e., username and/or password) may be received as a means of identifying the user and/or verifying that the user is authorized/registered to use the video assistance system.

At Event 404, the UI communicates the video session request to a first video session broker adaptor that, at Event 406, encapsulates the request, along with a user identifier, into a video assistant request message using a predetermined industry standard protocol, such as XMPP, HTTP, HTTPS, JSON or the like. Subsequently, at Event 408, the message is communicated, as a chat message, a Publish Subscribe message or the like, to a connection manage of a video session broker that has a persistent binding connection with the first session broker adaptor.

At Event 410, in response to the meeting broker receiving the video assistant request message, a database is queried, based on the user identifier, for the user's recent video session history. The recent history may be preconfigured as a prescribed number of previous video session or the video sessions conducted over a predetermined prior time period. At Event 412, one or more video assistant identifiers associated with each video assistant that conducted a previous video session with the user is retrieved from the database along with the average session time for video assistant's that conducted the recent video sessions with the user. The video assistant identifiers may include the name of the video assistant and any other relevant profile data (e.g., specific areas of expertise or the like). In specific embodiments the video assistant identifiers may include an image of the video assistant and/or a video clip of the video assistant. The video clip may be a prerecorded greeting by the video assistant or a snippet of a previous video session conducted between the user and the video assistant.

At Event 414, current availability information is determined for each of the video assistants that conducted video sessions included within the user's recent video session history. Current availability information may be determined as currently available with no/minimal wait time, not currently available or currently available with a wait time. In such embodiments of the invention, logic may be employed to dynamically determine a current (i.e., constantly updating) wait time based on the video assistants average time for a call/session throughout the system, the length of time of the video assistant's current ongoing call/session and the quantity of calls outstanding that the video assistant has in their queue.

At Event 416, the meeting broker encapsulates the video assistant identifier(s) and the availability information into a video assistant response message using the predetermined protocol of choice, e.g., XMPP, HTPP, HTPPS, JSON or the like and, at Event 418, the response message is communicated back to the first session broker adaptor of the remote video session module executing on the user device. In response to the first session broker adaptor receiving the response message, at Event 420, a video assistant selector widget is launched within the UI of the user's device and the widget displays the video assistant identifiers and the availability information. In specific embodiments of the invention, such display includes display of the image(s) and/or videos associated with the video assistants. The availability information may display the approximate wait time for the video assistant as a running clock feature that counts down the approximate wait time and is adjusted according based on the end of the user's current call and the quantity of callers in the video assistant's queue.

At Optional Event 422, a user selection of a video assistant is received within the video assistant selection widget and, at Optional Event 424, in response to receiving the user selection of the video assistant, a media plugin/client is loaded on the user device that is configured to provide a video session between the user and the selected video assistant. Additionally, a video assistant identifier associated with the selected video assistant and the user identifier are encapsulated into a video assistant selection message using the predetermined protocol. At Event 426, the video assistant selection message is communicated to video session broker, which, in turn, is configured to initiate a video session with the selected remote video assistant by generating and communicating a common room key to the user' device/platform and the video assistant's device/platform. The common room key is presented by corresponding media clients to a designated media server to initiate the video/audio connection between the user's device/platform and the video assistant' device/platform.

Referring to FIG. 6 a high-level schematic diagram of a system 10 for delivering video assistance through implementation of an Over-The-Top (OTT) application; i.e., video session broker 44, in accordance with embodiments of the present invention. The video session broker 44 provides separation between the multimedia application platforms (i.e., remote video session module 26 executing on a user/client platform and remote video assistant module 66 executing on a video assistant/agent platform) and the resource allocation infrastructure services 500. The separation eliminates the need for tight integration between the multimedia client/vendor and the underlying resource allocation infrastructure. The separation allows for the system 10 to be multimedia client/vendor-agnostic; meaning that video assistance can be established between the user and the video assistant regardless of the type video client employed by the user or the video assistant. In this regard, the video session broker 44 mitigates between different media client 30, 70 applications and backend infrastructure services 500, such as video-session host application services 502 and resource management services 504 (e.g., assistant selection, queueing, routing, and the like) by acting as a session brakeage to streamline the call workflow.

Specifically, the multimedia client/vendor-agnostic approach and the ability to include diverse infrastructure services that may employ different protocols is made possible by the video session broker 44 employing an industry standard protocol, such as XMPP or the like, that encapsulates different protocols messages with a common messaging protocol. Such a light client-server messaging transport provides a layer that "hovers" (i.e., over-the-to) over the resource allocation infrastructure services 500 and coordinates the audio/video session call requests from and video assistant-host application or widget. In response to the video session broker 44 receiving a request to initiate a multimedia session, the video session broker 44 will broker the request in a trigger-action mode, in which the video session initiation parameters hand-off occurs at the user platform.

Additionally functionality provided by the video session broker 44 includes the ability to maintain a presence of all active user and video assistant endpoints through implementation of a connection manager 46 (not shown in FIG. 6) that maintains a persistent connection with session broker adaptors 28, 68 (not shown in FIG. 6) included in the remote video session module 26 and the remote video assistant module 66. Moreover, the video session broker 44 provides the ability to hide call setup and media exchange complexity from the underlying resources allocation infrastructure services 500. Additionally, the video session broker employs a Representational State Transfer (REST) software architecture Applications Program interface (API) for applications key, authentication, user data transfer, virtual rooms, statistics and the like.

Additionally, the video session broker 44 provides for use of virtual video rooms 508, 510, 512, which is a logical meeting room that participants (users and video assistants) can join based on presentation of a unique room key generated by the video session broker 44. In this regard, the calling party application is not required to call directly to the video assistant. The video session broker generates a unique room key, e.g., virtual room key 1 506 and communicates the room key to both the user (remote video session module 26) and the video assistant (remote video assistant module 66). The remote video session module 26 and the remote video assistant module 66 present the key 506 to establish join the same virtual video room; virtual room 1 508 hosted by media server 80. It should be noted that the room key can be presented by any number of participants and, as such, more than one user and/or more than one remote video assistant may join the video session. The virtual room is hosted by any vendor using a Multipoint Conferencing unit (MCU), video bridge or the like.

Referring to FIG. 7 shown is a schematic diagram of a system 10 for delivering multimedia assistance specifically the session broker framework architecture highlighting the call flow for establishing a multimedia session, in accordance with embodiments of the present invention. The video session broker 44 coordinates video session requests between the remote video session module 26 and the remote video assistance module 66 and send requests on behalf of those modules 26 and 66 to backend resource management services 504. Asynchronous event-driven (client-server) messaging occurs between the video session broker 44 and the modules 26 and 66, as well between the video session broker 44 and the backend infrastructure services 50. For example, remote video session module 26 or the remote video assistance module 66 may send a request for a resource, which triggers, through the video session broker 44, a set of backend operations to assign the appropriate requested resource.

The process of initiating a multimedia call/session may begin by a user logging in to a host application 90, which may be included in the remote video session module 26 or may be a separate application/module. In specific embodiments, the host application may be a self-service application, such as a standalone Automated Teller Assist (ATA), and Automated teller Machine (ATM) with assist capabilities, a web-based application, a mobile-based application or the like. As the system 10 illustrates the log in process may require the host application 90 to directly communicate with the backend resource infrastructure services 500, specifically video-session-host application services 502 or the like.

The remote video session module 26 includes a session broker adaptor 28 client that includes a messaging client 92, such as XMPP client or the like. The session broker adaptor 28 connects to the video session broker anonymously or with a pre-assigned user ID based on specific remote video session module configuration. The call request is encapsulated in the messaging format of the messaging client 92 and communicated to the video session broker 44 that implements the meeting broker/coordinator 44, which is configured as a trigger/action API. The meeting broker/coordinator 44 passes the call request to a backend resource management service 504 implementing a request/respond resource availability (API).

Once the resource management service 504 responds to the session broker 44, the session broker 44 will encapsulate a constructed Uniform Resource identifier (URI) and a generated room key in the messaging format and communicated the encapsulated message to the session broker adaptor 28 of the remote video session module 26 and the session broker adaptor 68 of the remote video assistance module 66. In turn, the session broker adaptors 28 and 69 pass the URI and the room key to the media clients 30 and 70. The media clients 30 and 70 initiate the multimedia session by joining a designated virtual room associated with the room key, which is hosted by media server 80.

Referring to FIG. 8 schematic diagram of system 10 a high-level video session broker framework architecture highlighting session broker interaction with infrastructure services, in accordance with embodiments of the present invention. The user 700 may interface with the multimedia assistance service via a resident remote video session module 26a that may reside on a user device, such as a PC, laptop, tablet, mobile device or the like or may reside on a dedicated device, such as an ATM with assist, ATA or the like. Additionally, the user 700 may interface with the multimedia assistance service via a web-based remote video session module 26b that can be accessed via a web browser application 626 on a user device, such as a PC, laptop, mobile device or the like or may reside on a dedicated device, such as an ATM with assist, ATA or the like. The resident remote video session module 26A may include a host application 620, such as a banking application or the like. While in other embodiments of the invention, the host application may be distinct from the remote video session module 26A. The host application 620 may include an authentication routine 622 configured to verify the identity of user 700. The authentication provided by authentication routine 622 may include serve to authenticate the user for use of the multimedia assistance system 10 or. In other embodiments of the invention, a separate authentication routine may reside in the remote video session module 26. As previously discussed, remote video session module 26 also includes a session broker adaptor 28 including a messaging client 624, such as a XMPP client that is configured to connect with the video session broker 44 via HTTPS/WebSocket API or the like.

Video session broker 44 includes WebServer API, which may be a scalable Representational State Transfer (RESTful) software architecture API or the like. The API may include authentication client 602, meeting actions client 604, meeting controls client 606, meeting statistics client 608, federation interoperability client 610 and interoperability transmission/receipt client 612.

The authentication client 602 may be in communication with authentication hub 526 included in the backend infrastructure services 500. The authentication client 206 and authentication hub 526 communicate via asynchronous event-driven (client-server) messaging implemented in the session broker 44, such as messaging extension plugins 614 and messaging server 50, which may comprise XMPP extensions plugins and XMPP server or the like. The authentication provided by authentication client 602 and authentication hub may be integrated with authentication routine 622 of the host application 620 or may be in addition to the authentication routine 622 of the host application 622.

The meeting actions client 604 is configured to initiate the setup of a connection between a user and a video assistant/agent and communicates via asynchronous event-driven (client-server) messaging with backend infrastructure resources 500, such as contact center 522, signaling gateway 530, media server/vendor choice (MCU) 524 and the like. The meeting controls client 606 is configured to provide control over the video session, such as controlling commands affecting the multimedia session, such as muting the audio, moving the session from audio only to audio/video, or audio/video to audio only and the like. Similar, to the meeting actions client 604, meeting controls client 606 communicates via asynchronous event-driven (client-server) messaging with backend infrastructure resources 500, such as contact center 522, signaling gateway 530, media server/vendor choice (MCU) 524 and the like.

Meeting statistics client 608 is configured to capture statistics associated with an ongoing multimedia assistance session such as bandwidth, actions taken (e.g., mute, changes in audio/video form), collection of data and the like. Meeting statistics client 610 is in communication with backend infrastructure services 500, such as monitoring rules/traps 528, which serve to provide alerts/alarms and the like based on the results of the monitoring statistics.

Federation operability client 610 and interoperability TX/RX 612 are optional clients that are configured to allow two separate domains to communicate with one another during a multimedia assistance session and may communicate with backend resource infrastructure services 500, such as signaling gateway 530, contact center 522 and the like.

Thus, systems, apparatus, methods, and computer program products described above provide for an over-the-top intermediary application for delivering video assistance services. The systems and the like described above broker and coordinate all messaging between user and video assistant multimedia applications/platforms, as well as backend resource allocation infrastructure services. By encapsulating different protocol messages from disparate multimedia clients/vendors and backend infrastructure services into a common standard-based messaging protocol, the present invention is able to provide video assistance services regardless of which multimedia client is implemented by the user or video assistant and is able to readily implement new, emerging multimedia clients and backed infrastructure services in a plugin-like fashion. In addition, the video session broker of the present invention streamlines call workflow, maintains the presence of all user/video assistant endpoints, coordinates video session ignition requests and maintains messaging transport between users, video assistants and backend infrastructure resources.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for delivering a video assistance service, the system comprising:

a first computing platform including a first memory and at least one first processor in communication with the first memory;

a remote video session module stored in the first memory, executable by the first processor and configured to deliver the video assistance service to a user by implementing one of a plurality of different types of multimedia clients;

a second computing platform including a second memory and at least one second processor in communication with second memory;

a video session broker stored in the second memory, executable by the second processor, and configured to provide over-the-top initiation and maintenance of the video assistance session between the user and one or more video assistants by implementing an asynchronous event-driven messaging framework that is configured to allow for video assistance sessions to be established via the remote video session module for each of the plurality of different types of multimedia clients;
a third computing platform including a third memory and at least one third processor in communication with the third memory; and
a remote video assistant module stored in the third memory, executable by the third processor and configured to connect the user to a video assistant by implementing one of the plurality of different types of multimedia clients,
wherein the video session broker includes a connection manager that is configured to establish the video assistance session by generating a room key for a virtual video room and communicating the room key, via an encapsulated message, to the remote video session module and the remote video assistant module, wherein the remote video session module and the remote video assistant module present the room key to a designated media server associated with the room key to establish the remote video session.

2. The system of claim 1, wherein the video session broker is further configured to implement the asynchronous event-driven messaging framework to encapsulate different protocol messages from the different types of multimedia clients into a standard-based messaging protocol.

3. The system of claim 1, wherein the video session broker is further configured to implement the asynchronous event-driven messaging framework to communicate video session parameters and action triggers to the remote video session module.

4. The system of claim 1, wherein the video session broker is further configured to coordinate a request from the remote video session module to initiate the video assistance session between the user and the video assistant.

5. The system of claim 1, further comprising:
a fourth computing platform including a fourth memory and at least one fourth processor in communication with the fourth memory;
a plurality of infrastructure services stored in the fourth memory, executable by the fourth processor, wherein infrastructure services are assigned to the video assistance session by the asynchronous event-driven messaging framework of the video session broker.

6. The system of claim 5, wherein video session broker is further configured to encapsulate different protocol messages received from and communicated to the plurality of infrastructure services into a standard-based messaging protocol.

7. The system of claim 5, wherein the plurality of infrastructure services include one or more of authentication, signaling gateway, contact center, monitoring actions, media client selection and video assistance hosting applications.

8. The system of claim 1, wherein the video session broker further comprises a connection manager that is configured to maintain a presence of active remote video session modules through a persistent binding connection between the connection manager and a session broker adapter in an associated remote video session module.

9. The system of claim 5, wherein the video session broker further comprises a connection manager that is configured to maintain a presence of active remote video assistant modules through a persistent binding connection between the connection manager and a session broker adapter in an associated remote video assistant module.

10. The system of claim 1, wherein the video session broker is further configured to implement the asynchronous event-driven messaging framework that is configured to encapsulate different protocol messages from the different types of multimedia clients into a standard-based messaging protocol, wherein the standard-based messaging protocol is Extensible Messaging and Presence Protocol (XMPP).

11. The system of claim 1, wherein the video session broker is further configured to receive a request from the remote video session module to initiate the remote video session and, in response, broker the request in a trigger-action mode, wherein remote video session initiation parameters hand-off occurs at the remote video session module.

12. A method for delivering a video assistance service, the method comprising:
executing, by a computing device processor, a remote video session module within a video assistance user platform, wherein the remote video session module is configured to deliver the video assistance service to a user by implementing any one of a plurality of different types of multimedia clients; and
executing, by a computing device processor, an over-the-top video session broker that is configured to initiate and maintain a video assistance session between the user and a video assistant by implementing an asynchronous event-driven messaging framework that is configured to allow for video assistance sessions to be established via the remote video session module for each of the plurality of different types of multimedia clients,
wherein executing the over-the-top video session broker that is configured to initiate the video assistance session further comprises generating a room key for a virtual video room and communicating the room key, via an encapsulated message, to the remote video session module, and wherein executing the remote video session module further comprises presenting the room key to a designated media server associated with the room to establish the remote video session.

13. The method of claim 12, wherein executing the video session broker further comprises executing, by the computing device processor, the video session broker that is configured to encapsulate different protocol messages from the different types of multimedia clients into a standard-based messaging protocol.

14. The method of claim 12, wherein executing the video session broker further comprises executing, by the computing device processor, the video session broker that is configured communicate video session parameters and action triggers to the remote video session module.

15. The method of claim 12, wherein executing the video session broker further comprises executing, by the computing device processor, the video session broker that is configured to encapsulate different protocol messages received from and communicated to a plurality of infrastructure services into a standard-based messaging protocol.

16. A computer program product comprising:
a non-transitory computer-readable medium comprising:
a first set of codes for causing a computer to execute a remote video session module within a video assistance user platform, wherein the remote video session module is configured to deliver the video assistance service to a user by implementing any one of a plurality of different types of multimedia clients;

a second set of codes for causing a computer to execute an over-the-top video session broker that is configured to initiate and maintain a video assistance session between the user and a video assistant by implementing an asynchronous event-driven messaging framework that is configured to allow for video assistance sessions to be established via the remote video session module for each of the plurality of different types of multimedia clients;

a third set of codes for causing a computer to initiate the video assistance session by generating a room key for a virtual video room and communicating the room key, via an encapsulated message, to the remote video session module; and a fourth set of codes for causing a computer to establish the remote video session in response to the remote video session module further presenting the room key to a designated media server associated with the room key.

17. The computer program product of claim 16, wherein the second set of codes is further configured to cause the computer to execute the video session broker that is configured to encapsulate different protocol messages from the different types of multimedia clients into a standard-based messaging protocol.

* * * * *